United States Patent [19]

Tsuchida

[11] Patent Number: 4,745,994
[45] Date of Patent: May 24, 1988

[54] ANGULAR DECELERATION SENSOR

[75] Inventor: Tetsuo Tsuchida, Saitama, Japan

[73] Assignee: Honda Giken Kogyo Kabushiki Kaisha, Tokyo, Japan

[21] Appl. No.: 892,578

[22] Filed: Aug. 1, 1986

[30] Foreign Application Priority Data

Aug. 2, 1985 [JP] Japan .................. 60-170858

[51] Int. Cl.$^4$ ........................... B60T 13/06
[52] U.S. Cl. .................. 188/181 A; 200/61.46
[58] Field of Search .............. 188/181 A, 181 R; 303/113, 115, 119; 200/61.46

[56] References Cited

U.S. PATENT DOCUMENTS

| | | | |
|---|---|---|---|
| 31,387 | 9/1883 | Bayliss .................. 303/115 |
| 2,818,244 | 12/1957 | Ropar .................. 264/1 |
| 2,920,924 | 1/1960 | Reswick et al. .................. 303/24 |
| 3,046,060 | 7/1962 | Stager et al. .................. 303/21 |
| 3,352,388 | 11/1967 | Lieber .................. 303/24 R |
| 3,403,761 | 10/1968 | Rockwell .................. 188/265 |
| 3,556,613 | 1/1971 | Keller .................. 188/181 R |
| 3,655,016 | 4/1972 | Watanabe .................. 188/2 A X |
| 3,667,816 | 6/1972 | Harned . |
| 3,731,767 | 5/1973 | Lefort .................. 188/72.2 |
| 3,829,166 | 8/1974 | von Loewis et al. . |
| 3,908,805 | 9/1975 | Morse et al. .................. 188/181 A |
| 4,036,331 | 7/1977 | Hayashi et al. .................. 188/187 |
| 4,046,427 | 9/1977 | Baynes et al. .................. 303/115 |
| 4,061,212 | 12/1977 | Blomberg .................. 188/180 |
| 4,225,019 | 9/1980 | Blomberg .................. 188/181 R |
| 4,239,294 | 12/1980 | Burgdorf .................. 188/344 |
| 4,260,201 | 4/1981 | Farr .................. 188/181 A |
| 4,274,518 | 6/1981 | Berisch .................. 188/344 |
| 4,281,881 | 8/1981 | Mekosh et al. .................. 303/99 |
| 4,289,359 | 9/1981 | Lüpertz et al. .................. 188/344 |
| 4,340,258 | 7/1982 | Farr .................. 303/115 |
| 4,350,396 | 9/1982 | Mortimer .................. 303/115 |
| 4,353,440 | 10/1982 | Farr .................. 188/181 A |
| 4,354,715 | 10/1982 | Farr et al. .................. 303/116 |
| 4,355,849 | 10/1982 | Wilson .................. 303/116 |
| 4,365,538 | 12/1982 | Andoh .................. 91/1 |
| 4,377,221 | 3/1983 | Farr .................. 188/181 A |
| 4,381,049 | 4/1983 | Crossman .................. 188/72.7 |
| 4,381,125 | 4/1983 | Wilson .................. 303/116 |

(List continued on next page.)

FOREIGN PATENT DOCUMENTS

| | | |
|---|---|---|
| 55-14295 | 4/1980 | Japan . |
| 55-45421 | 11/1980 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |
| 1121561 | 7/1968 | United Kingdom . |
| 1142500 | 2/1969 | United Kingdom . |
| 1159592 | 7/1969 | United Kingdom . |
| 1252674 | 11/1971 | United Kingdom . |
| 1376042 | 12/1974 | United Kingdom . |
| 1496721 | 12/1977 | United Kingdom . |
| 2069639 | 2/1981 | United Kingdom . |
| 2069641 | 2/1981 | United Kingdom . |
| 2069642 | 8/1981 | United Kingdom . |
| 2069641A | 8/1981 | United Kingdom . |
| 2070166A | 9/1981 | United Kingdom . |
| 2109494 | 6/1983 | United Kingdom . |
| 2120336 | 11/1983 | United Kingdom . |

OTHER PUBLICATIONS

SAE Technical Series 8304, "Performance of Antilock Brakes with Simplified Control Technique", by Makoto Satoh & Shuji Shiraishi, 1983.

SAE Section 5: Technical Sessions, pp. 903-909, "Performance of a Simplified Control Technique for Antilock Brakes: by Makoto Satoh & Shuji Shiraishi, 1983.

Primary Examiner—Duane A. Reger
Attorney, Agent, or Firm—Lyon & Lyon

[57] ABSTRACT

An angular deceleration sensor adapted for sensing by the overrunning of a flywheel an angular deceleration in excess of a predetermined value of a detected subject which rotates in a fixed direction. A clutch is interposed between the flywheel and a drive shaft for transmitting the rotation of the subject to the flywheel, the clutch being in the form of a unidirectional clutch which assumes a locked state when the drive shaft is in a drive position with respect to the flywheel.

10 Claims, 8 Drawing Sheets

U.S. PATENT DOCUMENTS

| | | | |
|---|---|---|---|
| 4,387,934 | 6/1983 | Farr | 303/115 |
| 4,401,348 | 8/1983 | Farr | 303/116 |
| 4,405,006 | 9/1983 | Preusker | 152/170 |
| 4,405,181 | 9/1983 | Resch et al. | 303/9 |
| 4,414,630 | 11/1983 | Harris et al. | 364/426 |
| 4,416,353 | 11/1983 | Ivanov | 188/2 A |
| 4,421,359 | 12/1983 | Hayashi et al. | 303/6 A |
| 4,422,695 | 12/1983 | Farr | 303/115 |
| 4,428,624 | 1/1984 | Farr | 303/116 |
| 4,456,309 | 6/1984 | Rath | 303/10 |
| 4,456,310 | 6/1984 | Hayashi et al. | 303/119 |
| 4,457,563 | 7/1984 | Farr | 303/92 |
| 4,465,322 | 8/1984 | Hayashi | 303/6 A |
| 4,474,413 | 10/1984 | Farr | 303/116 |
| 4,475,774 | 10/1984 | Davis | 303/112 |
| 4,494,800 | 1/1985 | Hayashi | 303/6 A |
| 4,564,244 | 1/1986 | Reinartz et al. | 303/6 C |
| 4,602,705 | 7/1986 | Farr | 188/181 A |

ANGULAR DECELERATION SENSOR

BACKGROUND OF THE INVENTION

1. Field of the Invention

The present invention relates to an angular deceleration sensor which is used to detect an angular deceleration above a predetermined value of a wheel as a detected subject during the control of an antilock brake device for vehicles, for example, such as motorcycles and automobiles, and more particularly to an improvement in an angular deceration sensor wherein a flywheel is rotatably and slidably carried on a drive shaft operatively connected to the wheel rotating in a fixed direction, and between the drive shaft and the flywheel are interposed in series a clutch which normally transmits a driving torque of the drive shaft to the flywheel and allows, when the angular deceleration over a predetermined value occurs in the wheel, the flywheel an overrun rotation, and a cam mechanism for imparting an axial displacement to the flywheel in response to the overrun rotation thereof, the axial displacement of the flywheel being released as an angular deceleration signal.

2. Description of the Prior Art

A conventional angular deceleration sensor of this kind uses, as a clutch, a friction clutch which acts in both one and the other rotational directions (See Japanese Patent Application Laid-Open No. 126241/1983).

The clutch for the angular deceleration sensor of this kind has to provide two functions, one wherein the flywheel is accurately permitted to be slipped to provide the overrunning when an angular deceleration above a predetermined value occurs in the detected subject, and the other wherein the driving torque of the drive shaft may be positively transmitted to the flywheel. However, as in the prior art, where a friction clutch which acts in both one and the other directions is used as a clutch, when a friction force of the friction clutch is adequately set so as to accurately create the overrun rotation in the flywheel, an insufficient friction force results for driving the flywheel from the drive shaft, and when the subject is rapidly accelerated in rotation, there is a fear that the clutch becomes slipped for a short period of time, as a result of which the flywheel fails to follow the drive shaft.

SUMMARY OF THE INVENTION

The present invention has been achieved in view of the above-described circumstances. It is an object of the invention to provide the aforementioned angular deceleration sensor which can accurately cause an overrun rotation to occur in a flywheel when an angular deceleration above a predetermined value occurs in a detected subject, and which is normally able to positively drive the flywheel from a drive shaft.

For achieving the above-described object, the present invention is characterized in that the clutch is in the form of a unidirectional clutch which assumes its locked state when the drive shaft is on the drive side with respect to the flywheel.

Since the unidirectional clutch assumes the locked state when the drive shaft is on the drive side with respect to the flywheel, the drive shaft positively drives the flywheel through the clutch. Accordingly, even when the subject is accelerated, the flywheel is allowed to follow the drive shaft.

When an angular deceleration above a predetermined value occurs in a detected subject, the unidirectional clutch becomes slipped to allow the flywheel to provide the overrunning rotation.

The above and other objects, features and advantages of the present invention will become apparent from the ensuing description of preferred embodiments in connection with the accompanying drawings.

BRIEF DESCRIPTION OF THE DRAWINGS

FIGS. 1 through 8 show one embodiment wherein an antilock brake device having an angular deceleration sensor according to the present invention is mounted on a motorcycle, FIG. 1 being a schematic plan view of a motorcycle, FIG. 2 being a side elevation in section showing essential parts of the antilock brake device, FIGS. 3 and 4 being respectively sectional views taken on line III—III and IV—IV of FIG. 2, FIG. 5 being a sectional view taken on line V—V of FIG. 3, FIG. 6 being an exploded perspective view of the angular deceleration sensor, FIGS. 7(a) and 7(b) being the illustration of an operation of a cam mechanism, and FIG. 8 being an electric circuit diagram of a detector for detecting operation of a hydraulic pump;

DETAILED DESCRIPTION OF THE PREFERRED EMBODIMENTS

Embodiments of the present invention will be described with specific reference to the accompanying drawings.

Figure 1:
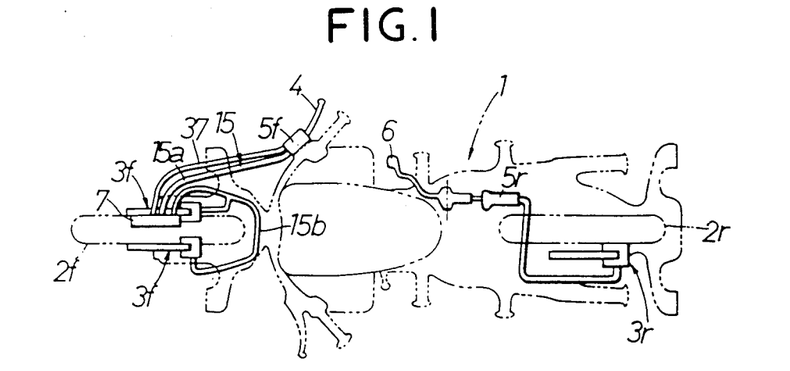

Referring first to FIG. 1, a motorcycle 1 has a pair of front right and left wheel brakes 3f for braking a front wheel 2f and a single rear wheel brake 3r for braking a rear wheel 2r. The front brakes 3f are operated by the output of hydraulic pressure from a front master cylinder 5f operated by a brake lever 4. The rear brake 3r is operated by the output of hydraulic pressure from a rear master cylinder 5r which is actuated by a brake pedal 6. In this embodiment, the hydraulic pressure to the front wheel brakes 3f are controlled by an antilock controller 7.

Figure 2:
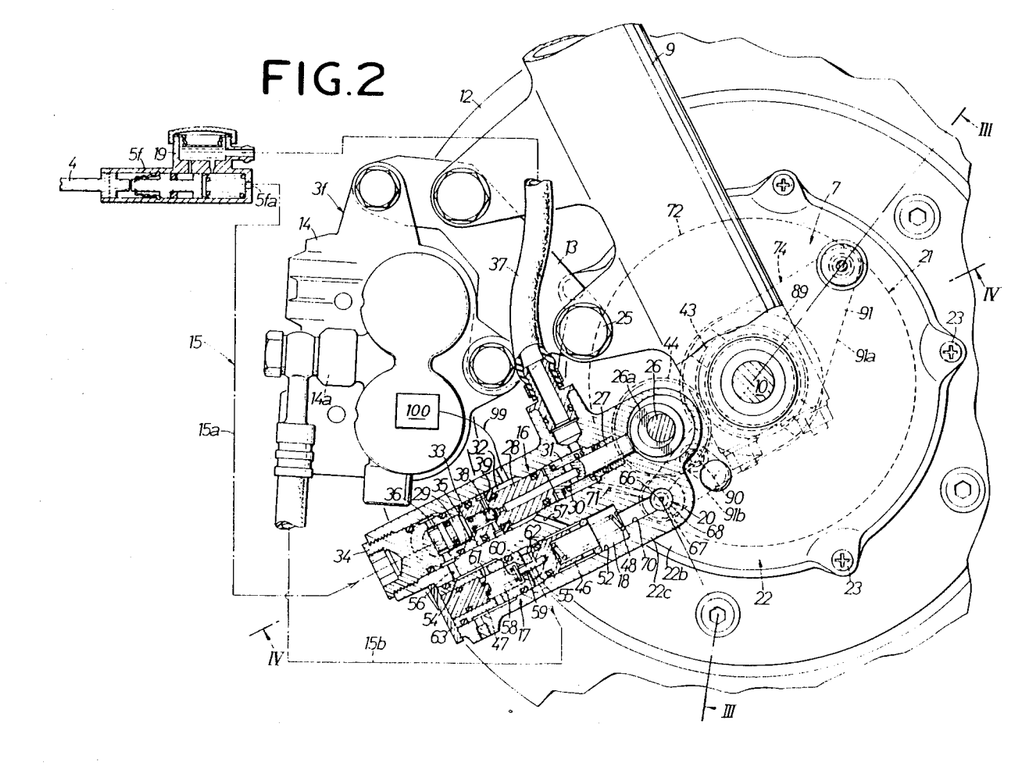
Figure 3:
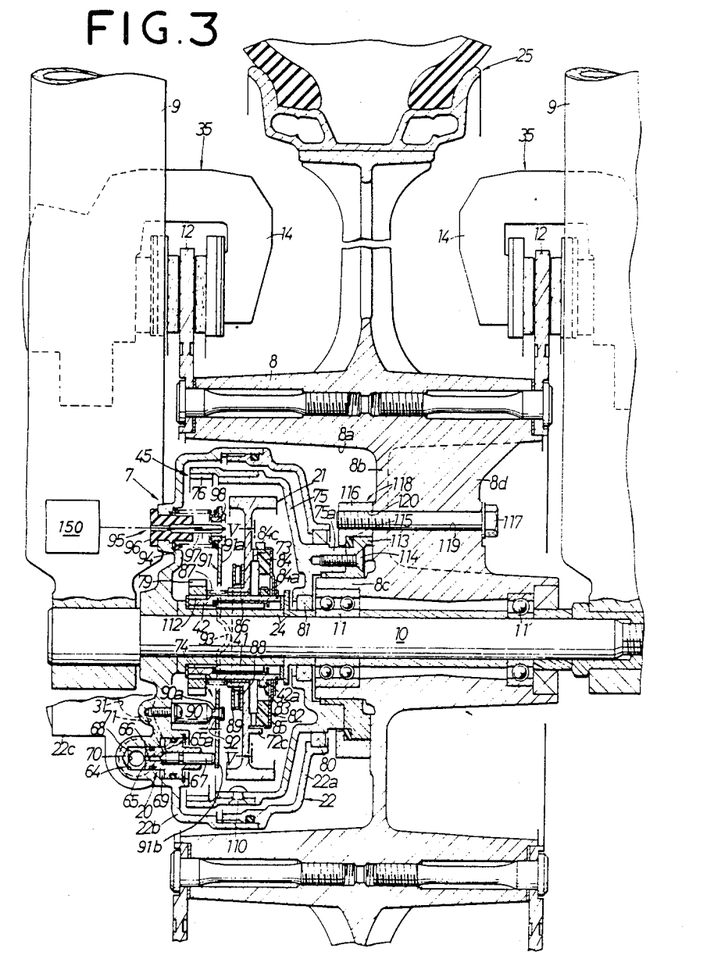

Turning to FIGS. 2 and 3, a hub 8 of the front wheel 2f is supported through two bearings 11 and 11' on an axle 10 secured to the lower ends of a front fork 9. Each of the brakes 3f includes a brake disc 12 securely fixed to the end face of the hub 8 and a brake caliper 14 straddling the disc 12 and supported by a bracket 13 to the front fork 9. The caliper 14 operates to grip the brake disc 12 when the output of hydraulic pressure from the cylinder 5f is supplied to the input port 14a. In the way, a braking force is applied to the wheel 2f.

The antilock brake device 7 is interposed in the hydraulic conduit 15 coupled between the output port 5fa of the master cylinder 5f and the input port 14a of the caliper 14.

The brake device 7 includes within a common casing 22 a hydraulic pump 16 driven by the wheel 2f during braking, a modulator 17 having a hydraulic control chamber 18 to receive the discharge pressure of the pump 16 and interposed in the midst of the conduit 15, a normally closed exhaust pressure valve 20 interposed in a passage between the chamber 18 and a reservoir 19, and an inertia type angular deceleration sensor 21 which senses an angular deceleration above a predetermined value of the front wheel 2f to open the valve 20.

The casing 22 has a cup-shaped inner casing 22a and an outer casing 22b, open ends of which are fixed each other by screws. The outer casing 22b is integrally formed at its end wall with an radially outwardly extending portion 22c. The casing 22 except the extension 22c is arranged in a recess 8a formed to the left end of the hub 8. The outer casing 22b is supported on the axle 10 extending through the center portion of the end wall thereof and is also connected to the front fork 9 by means of an attachment mechanism so as not to rotate about the axle 10. The attachment mechanism may be of arbitrary or conventional construction as, for example, bolts 25, illustrated in FIG. 2, for clamping a bracket 13 to the front fork 9.

The hydraulic pump 16 includes a camshaft 26 arranged parallel to the axle 10, a pushrod 27 arranged with its inner end opposed to an eccentric cam 26a formed on the camshaft 26, a pump piston 28 in contact with the outer end of the pushrod 27, an operating piston 29 in contact with the outer end of the pump piston 28, and a return spring 30 arranged to bias the pushrod 27 away from the eccentric cam 26a.

The pushrod 27 and the pump piston 28 are slidably arranged within a first cylindrical hole 33 formed in the extension 22c to define an inlet chamber 31 and an outlet chamber 32. A plug 34 is fitted into the outer end of the hole 33 to define a pump chamber 35 at the end of the piston 28. The piston 29 is slidably arranged within the plug 34 so as to form a hydraulic chamber 36 in the plug 34.

The inlet chamber 31 communicates with the fluid reservoir 19 through a conduit 37. This chamber 31 further communicates through a suction valve 38 with the pump chamber 35. The pump chamber 35 in turn communicates with the outlet chamber 32 through a unidirectional sealing member 39. The hydraulic chamber 36 is connected to the upstream conduit 15a of the conduit 15 so that the chamber 16 is always in communication with the output port 5fa of the cylinder 5f.

Figure 4:
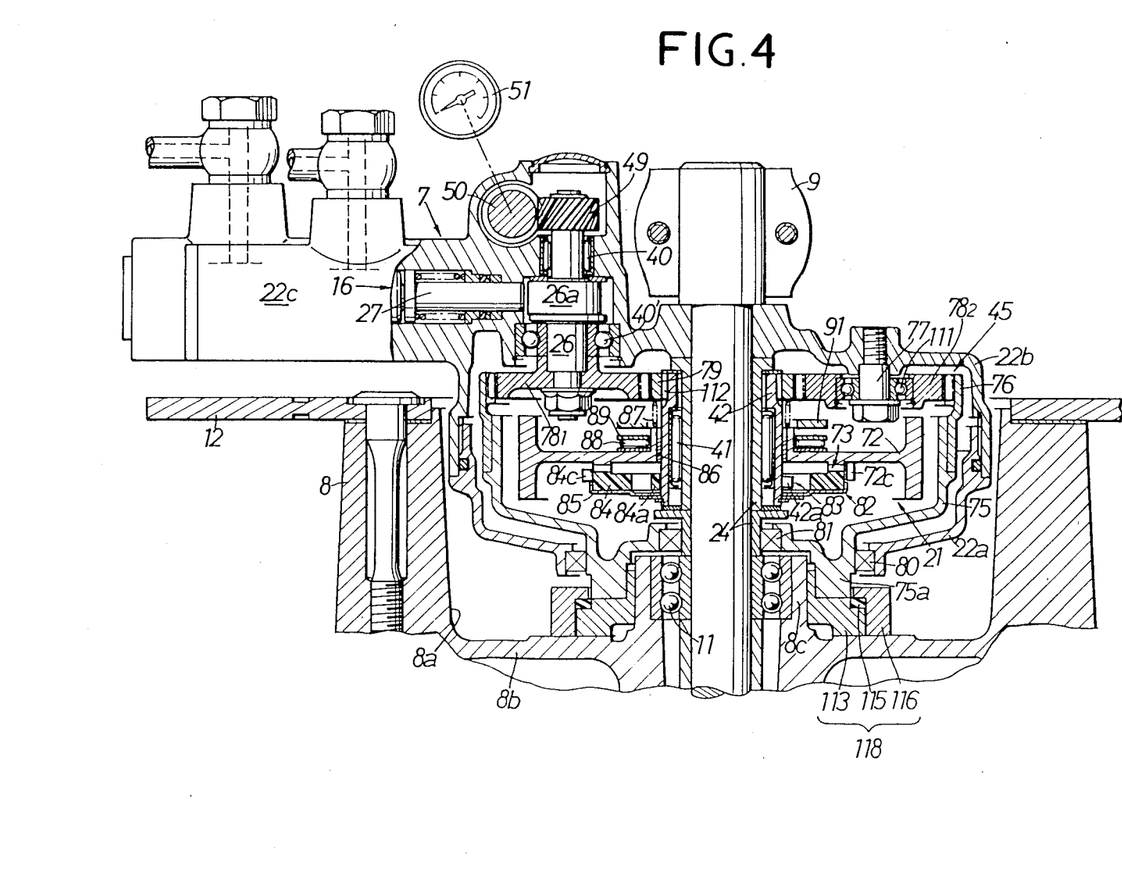

As illustrated in FIG. 4, the camshaft 26 is supported to the outer casing 22b through bearings 40 and 40' and is driven by the front wheel 2f through a velocity increasing device 45 which will be described later.

A meter drive gear 49 is secured to the outer end of the camshaft 26. The meter drive gear 49 is engaged with a driven gear 50 which is in turn connected to the input shaft of a speedometer 51 of the motorcycle.

The modulator 17 includes a pressure reducing piston 46, a stationary piston 47 abutting one end of the pressure reducing piston 46 to restrict the backward movement thereof, and a return spring 48 for biasing the piston 47 into contact with the piston 47. Both the pistons 46 and 47 are slidably disposed within a second cylindrical hole 52 which is formed adjacent the first cylindrical hole 33 in the extension 22c.

In the second cylinder hole 52, the piston 46 defines the control hydraulic chamber 18 against the inner end wall of the hole 52 and defines an output hydraulic chamber 55 against the piston 47. The stationary piston 47 defines an input hydraulic chamber 54 against the outer periphery thereof. The input hydraulic chamber 54 is in communication with the chamber 36 of the pump 16 through an oil passage 56. The output hydraulic chamber 55 is connected to the downstream conduit 15b of the conduit 15 so that the chamber 55 is always in communication with the input port 14a of the front wheel brakes 3f. The control hydraulic chamber 18 communicates with the outlet chamber 32 of the pump 16 through an oil passage 57.

The piston 47 has a valve chamber 58 which is always in communication with the input hydraulic chamber 54 and a valve port 59 for communication between the valve chamber 58 and the output hydraulic chamber 55. The valve chamber 58 encases therein a valve body 60 capable of opening and closing the valve port 59 and a valve spring 61 for biasing the valve body 60 to the closed position. A valve opening rod 62 for opening the valve body 60 extends from one end of the pressure reducing piston 46 and maintains the valve body 60 in the open state when the piston 46 is disposed at its retracted limit.

The outer opening of the second cylindrical hole 52 is closed by an end plate 63 fixed to the extension 22c. The piston 47 is always maintained in contact with the end plate 63 by the resilient force of the spring 48 or by the hydraulic pressure introduced into the chambers 54 and 55.

The pump 16 and the modulator 17 are disposed on the back side of the front fork 9 in a similar arrangement to that of the caliper 14.

The exhaust pressure valve 20 includes a valve seat member 65 which is engaged within a stepped cylindrical hole 64 of the outer casing 22b, and a valve body 67 slidably arranged within the valve seat member 65 to control a valve port 66. The member 65 defines an inlet chamber 68 in the reduced diameter portion of the stepped cylindrical hole 64 and an outlet chamber 69 in the enlarged diameter portion of the stepped cylindrical hole 64. The chambers 68 and 69 communicate through the port 65a of the valve port 66 and the valve seat member 65. The chamber 68 communicates with the chamber 18 of the modulator 17 through an oil passage 70. The chamber 69 communicates with the chamber 31 of the pump 16 through an oil passage 71. Therefore, eventually the chamber 69 communicates with the reservoir 19.

The wheel angular deceleration sensor 21 includes the velocity increasing device 45 accelerating the front wheel 2f, a transmission mechanism 82 connected to the unit 45, a flywheel 72 rotated by the transmission mechanism 82, a cam mechanism 73 for converting the overrunning rotation of the flywheel into an axial displacement, and an output lever mechanism 74 which controls operation of the exhaust pressure valve 20 in response to the axial displacement of the flywheel 72, all of these elements being arranged within the casing 22.

The velocity increasing device 45 is composed of a cup-shaped input member 75 disposed within the casing 22 with the open end directed toward the casing 22b, a ring gear 76 secured to the open end of the input member by means of rivets 110, a first planetary gear $78_1$ secured to the inner end of the camshaft 26 and engaing the ring gear 76, one or more second planetary gears $78_2$ supported through a bearing 111 on shafts 77 extended on the end wall of the casing 22b and engaging the ring gear 76, and a sun gear 79 which simultaneously engages the first and second planetary gears $78_1$ and $78_2$.

The input member 75 is formed of a lightweight material such as Al alloy. The ring gear 76 is formed of a high-strength material such as steel, thereby obtaining the velocity increasing device 45 which is lightweight and has a high durability.

The second planetary gears $78_2$ are provided in order to provide a proper engagement between the first planetary gear $78_1$, the ring gear 76 and the sun gear 79 so as to maintain the concentric state between the ring gear 76 and the sun gear 70 to ensure the transmission action of the device 45. In the case where the ring gear 76 and the sun gear 79 are highly rigidly supported, the second planetary gears can be excluded.

A short sleeve 75a extending through the end wall of the inner casing 22a is integrally projected from the end wall of the input member 75. A connection flange 113 is secured by means of screws 114 to the end face of the sleeve 75a.

The connection flange 113 is rotatably fitted to a boss 8c projected from the center on the lefthand of the central vertical partitioning wall 8b within the hub 8. The flange 113 is also clamped by the wall 8b and a connection ring 116 through a resilient friction member 115 formed of rubber, synthetic resin or the like.

The connection ring 116 is rotatably fitted in the outer peripheral surface of the connection flange 113 and has an L-shape in section so as to be opposed to the inner side thereof with a given spacing left. The ring 116 is secured to the central wall 8b by means of a plurality of bolts 117 (only one of which is shown). The resilient friction member 115 is mounted in the aforesaid spacing with a predetermined set load. In this way, the connection flange 113, the connection ring 116 and the resilient friction member 115 constitute a transmission torque restricting device 118.

The bolts 117 are inserted into bolt holes 119 extending through the wall 8b and a reinforcing rib 8d raised from the right side thereof, from the righthand or from the side opposite the connection ring 116, and then fixed to tapped holes 120 of the connection ring 116.

In order to seal the interior of the casing 22, a sealing member 80 and a sealing member 81 are respectively interposed between the sleeve 75a and the end wall of the inner casing 22a and between the end wall of the input member 75 and the sleeve shaft 24.

The transmission mechanism 82 includes an output shaft 42 in the form of a drive shaft which is spline coupled to the sun gear 79 of the velocity increasing device 45 and carried on the stationary sleeve shaft 24 on the axle through needle bearings 41, and a transmission wheel 84 formed of synthetic resin which encircles the output shaft 42 and is connected to the shaft 42 through a unidirectional clutch 83.

Figure 5:
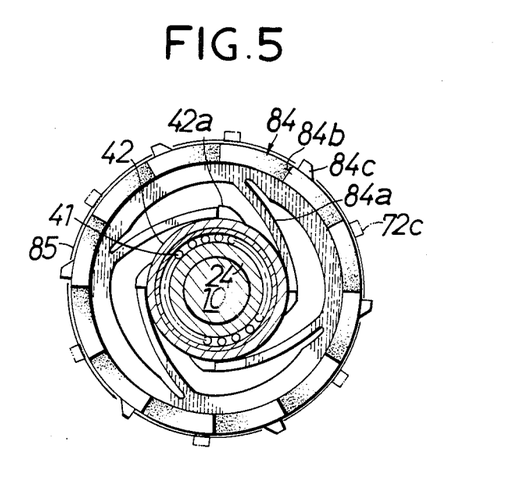
Figure 6:
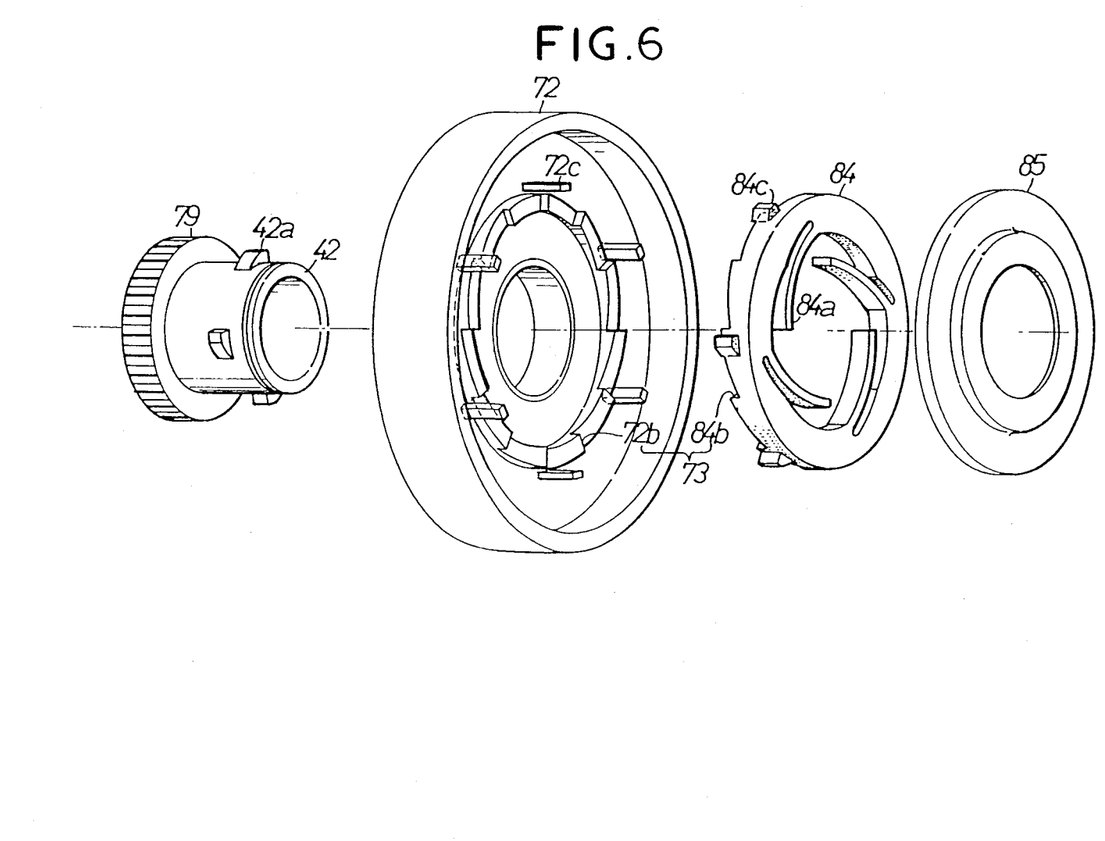

The transmission wheel 84 has a plurality of (four in the illustrated embodiment) resilient pawls 84a extending along the inner peripheral surface thereof and engaging projections 42a, which may be engaged with and disengaged from the pawls 84a, projected into the outer peripheral surface of the output shaft 42, as best seen in FIGS. 5 and 6.

These resilient pawls 84a and the engaging projections 42a constitute a unidirectional clutch 83 which assumes its locked state when the output shaft 42 is in the position on the drive side with respect to the transmission wheel 84. In FIG. 3, reference numeral 85 designates a cover for the transmission wheel 84.

If the transmission wheel 84 is formed from synthetic resin as described above, the cost thereof can be reduced.

While in the illustrated embodiment, the shaft 24 is axially divided into two parts for the reason of manufacture, it is to be noted that these can be put together.

The flywheel 72 is rotatably and slidably supported on the output shaft 42 through a bushing 86 within the cup-shaped input member 75.

As may be clearly shown in FIG. 6, the cam mechanism 73 is composed of a saw tooth 84b formed in the end face of the transmission wheel 84 opposite the flywheel 72 and a saw tooth 72b formed in the flywheel 72 so that the tooth 72b may engage with and disengage from the tooth 84b. Upon engagement and disengagement between the saw teeth 84b and 72b, the forward rotation of the transmission wheel 84 is transmitted to the flywheel 72.

In the outer peripheral surface of the transmission wheel 84 are formed a plurality of (six in the illustrated embodiment) projecting portions 84c, which project outwardly from the tip of the saw tooth 84b at an equally spaced relation on the circumference thereof. On the other hand, in the flywheel 72 are formed six projecting portions 72c projecting outwardly from the tip of the saw tooth 72b for engagement with and disengagement from each projecting portion 84c.

Figure 7A:
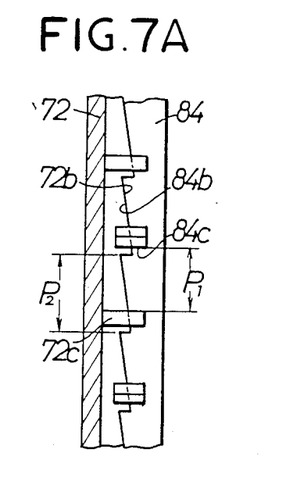

As clearly shown in FIG. 7(a), in the state where both the saw teeth 72b and 84b are in engagement with each other, pitch $P_1$ between both the projecting portions 72c and 84c is set to be smaller than pitch $P_2$ between the saw teeth 72b, whereby when the flywheel 72 is in its overrunning rotation, the projecting portion 72c of the flywheel 72 contacts with the projecting portion 84c of the transmission wheel 84. Therefore, it is possible to prevent the tooth 72b of the flywheel 72 from getting over the tooth 84b of the transmission wheel 84. Accordingly, both the projecting portions 72c and 84c constitute a stopper means for preventing such a getting over.

Between the sun gear 79 and the flywheel 72 is interposed a return spring 87 in a compressed state for biasing the flywheel 72 toward the transmission wheel 84 to apply an engaging force to both the saw teeth 72b and 84b.

A pressing plate 89 is provided through a thrust bearing 88 on the end face in the center of the flywheel 72 on the side of the sun gear 79.

The outlet lever mechanism 74 includes a supporting shaft 90 which projects from the inner surface of the casing 22b at an intermediate position between the axle 10 and the valve 20, and a lever 91 swingably supported in the axial direction of the axle 10 at a neck 90a at the end of the shaft 90. A predetermined clearance or play 92 is provided in the axial direction between the neck 90a and the lever 91. The lever 91 is composed of a long first arm 91a which extends around the shaft 42 from the supporting shaft 90, and a short second arm 91b which extends from the shaft 90 toward the exhaust pressure valve 20. Midway of the arm 91a, a portion thereof is raised to define an abutment portion 93 which abuts against the outside surface of the pressing plate 89.

A spring 94 is interposed in a compressed state betwen the end of the arm 91a and the outer casing 22b, and the end of the arm 21b abuts against the outer end of the valve body 67 of the valve 20.

The resilient force of the spring 94 acts on the lever 91 to press the abutment portion 93 of the arm 91a against the pressing plate 89 which in turn presses the arm 91b against the valve body 67 of the exhaust pressure valve 20 to hold the valve body 67 in a closed state. The pressing force of the plate 89 from the spring 94 causes the engaging force to be applied to the teeth 72b and 84b of the cam mechanism 73.

A detector 95 for detecting the normal operation of the lever mechanism 74 is connected to the lever mechanism. The detector 95 comprises a switch holder 96 secured to the outer casing 22b and protruding into the center of the spring 94, a lead switch 97 held by the holder 96 in the coil of the spring 94, and a permanent magnet 98 attached to the first arm 91a adjacent the switch 97. When the arm 91a is rocked by a predetermined angle relative to the casing 22b, the magnet 98 is displaced to close the position of the switch 97. A display device 150 is connected to the lead switch 97.

Thus, when the lever 91 is rocked toward the outer casing 22b against the resilient force of the spring 94, the magnet 98 is accordingly moved closer to the lead switch 97 to close the latter to actuate the display device 150. Therefore, one may know the normal operation of the lever 91.

Operation of the above-described embodiment will now be described.

When the vehicle is running, the forward rotation of the front wheel 2f is transmitted from the hub 8 to the input member 75 through the connection ring 116, resilient friction member 115 and the connection flange 113, further transmitted to the output shaft 42 while being increased in velocity by the ring gear 76, the first and second planetary gears $78_1$, $78_2$ and the sun gear 79 to lock the unidirectional clutch 83, and transmitted to the flywheel 72 via the clutch, the transmission wheel 84 and the cam mechanism 73 to drive the flywheel. Thus the flywheel 72 is rotated at a speed faster than the wheel 2f. This provides additional rotary inertia to the flywheel 72.

At the same time, the cam shaft 26 and the speedometer 51 are driven by the rotation of the first planetary gear $78_1$.

When an overload is applied to the angular deceleration sensor 21 for some cause, either the connection ring 116, the resilient friction member 115 or the connection flange 113 slips so that the transmission torque from the hub 8 to the input member 75 is restricted to a level less than a predetermined value, as a consequence of which action of the overload on the sensor 21 can be prevented beforehand.

When the front master cylinder 5f is operated to brake the wheel 2f, the hydraulic pressure output is transmitted sequentially through the upstream conduit 15a of the conduit 15, the chamber 36 of the pump 16, the chamber 54 of the modulator 17, the valve chamber 58, the valve port 59, the output hydraulic chamber 55 and the downstream conduit 15b of the conduit 15 to the front brake 3f. Braking force is thus applied to the wheel 2f.

In the pump 16, the output hydraulic pressure of the front master cylinder 5f is introduced to the chamber 36. Thus, the pump piston 28 is reciprocated by the action of the hydraulic pressure on the piston 29 and the lifting action of the push rod responsive to the eccentric cam 26a. During the suction stroke of the piston 28 when the piston moves toward the pushrod 27, the suction valve 38 is opened and the oil from the reservoir 19 is sucked through the conduit 37 and the inlet chamber 31 to the chamber 35. During the discharge stroke of the pump piston 28 with the piston 28 moving toward the operating piston 29, the sealing member 39 opens to feed the hydraulic fluid in the pump chamber 35 to the outlet chamber 32 and further through the oil passage 57 to the control hydraulic chamber 18 of the modulator 17. When the pressures of the chambers 32 and 18 rise to a predermined level, the piston 28 is held in contact with the plug 34 by the pressure of the chamber 32.

Since the communication between the chamber 18 of the modulator 17 and the reservoir 19 is initially interrupted by the closing of the exhaust pressure valve 20, the hydraulic pressure supplied to the control hydraulic chamber 18 acts directly on the piston 46 to press the piston 46 to its retracted position. Thus, the valve body 60 is held in the valve open state by the rod 62. This allows the output hydraulic pressure of the cylinder 5f to pass therethrough.

The brake force applied to the brakes 3f becomes proportional to the hydraulic pressure of the cylinder 5f at the initial state of braking.

When an angular deceleration is generated by the wheel 2f in response to the braking, the flywheel 72 senses the deceleration and tends to overrun the driveshaft 42 by the stored inertia force in the flywheel 72. The relative movement of the flywheel 72 under this condition produces relative rotation between the saw teeth 72b and 84b of the cam mechanism 73 whereby the saw tooth 72b of the flywheel 72 rides on the saw tooth 84b of the transmission wheel 84 to axially displace the flywheel 72 by the thrust generated thereby. In turn, the pressing plate 89 is forced axially to push the lever 91.

The motion of the lever 91 in response to movement of the pressing plate 89 is discussed. Since the play 92 is present between the supporting shaft 90 and lever 91, the lever 91 is first supported at three points, i.e., by the spring 94, the pressing plate 89 and the valve body 67 of the exhaust pressure valve 20. If the axial motion continues, the lever 91 is pressed by the plate 89 to rock about the valve body 67 serving as a fulcrum. When the rocking motion of the lever 91 advances to a predetermine degree, the play 92 between the supporting shaft 90 and the lever 91 is eliminated and the fulcrum of the lever moves from the valve body 67 to the shaft 90 which is closer to the contact portion 93. This time, the lever 91 rocks about the shaft 90.

Since the lever ratio during the rocking of the lever 91 by the pressing plate 89 changes in two stages, even if the repulsion of the spring 94 is constant, the lever 91 first rocks by a relatively small force of the plate 89 and after the rocking fulcrum has moved, the lever is not rocked unless the force increases to the predetermined value. Thus, during braking, at the stage where the angular deceleration generated in the wheel 2 is relatively small, the lever 91 rocks by the force of the plate 89 to bring the permanent magnet 98 toward the closed position with the switch 37. The display circuit 150 is operated as described above by this motion of the magnet to notify the driver that the sensor 21 is operating normally.

Figure 7B:
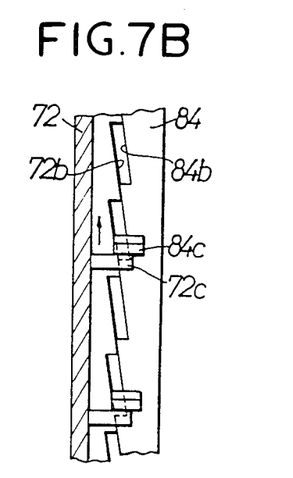

When the wheel 2f is about to lock due to the excessive brake force or a decrease in the frictional coefficient of the road surface, the angular deceleration of the wheel 2f rapidly increases accordingly. The saw tooth 72b of the flywheel 72 rides on the saw tooth 84b of the transmission wheel 84 to such an extent that the end of the tooth 72b is positioned in the vicinity of the end of the saw tooth 84b of the transmission wheel 84, as shown in FIG. 7(b). Therefore, the force of the pressing plate 89 exceeds the predetermined value. Under this condition, the projecting portion 72c of the flywheel 72 contacts with the projecting portion 84c of the transmission wheel 84 thereby preventing the saw tooth 72b of the flywheel 72 from riding over the saw tooth 84b of the transmission wheel 84. Furthermore, the pawl 84a of the unidirectional clutch 83 slips relative to the engaging projection 42a and therefore, the transmission wheel 84 overruns along with the flywheel 72. Thereby the overload from the flywheel 72 to the cam mechanism 73 is interrupted.

As described above, when the force of the pressing plate 89 exceeds a predetermined value, the lever 91 rocks about the supporting shaft 90 in a manner as to further compress the spring 94. Therefore, the second arm 91b of the lever 91 rocks so as to be away from the valve body 67, as a consequence of which the exhaust pressure valve 20 opens.

When the valve 20 opens, the hydraulic pressure in the control hydraulic chamber 18 is exhausted through the passage 70, the inlet chamber 68, the valve port 66, the outlet chamber 69, the oil passage 71, the inlet chamber 31 of the hydraulic pump 16 and the conduit 37 to the reservoir 19. Consequently, the pressure reducing piston 46 is returned by the hydraulic pressure of the output hydraulic chamber 55 toward the chamber 18 against the tension of the return spring 48. As a result, the opening valve rod 62 is retracted to close the valve body 60. The valve body 60 then interrupts the communication between the input and output hydraulic chambers 54 and 55 and increases the volume of the chamber 55. The brake hydraulic pressure acting on the brake 3f then decreases to reduce the brake force of the wheel 2f. The reduction in the brake force results in the avoidance of locking. With this, the acceleration in rotation of the front wheel 2f causes the projection 42a of the unidirectional clutch 83 to engage the pawl 84a and the saw teeth 72b and 84b of the cam mechanism 73 engage to release the pressing force of the pressing plate 89 to the lever 91. The lever 91 is then returned to its initial position by the force of the spring 94 to close the valve 20. When the valve 20 closes, the hydraulic oil discharged from the pump 16 is immediately sealed in the chamber 18. The piston 46 then retracts toward the chamber 55 to raise the hydraulic pressure in the chamber 55. This again increases brake force. This operation is repeated at high frequency and therefore, the front wheel 2f is braked efficiently.

Figure 8:
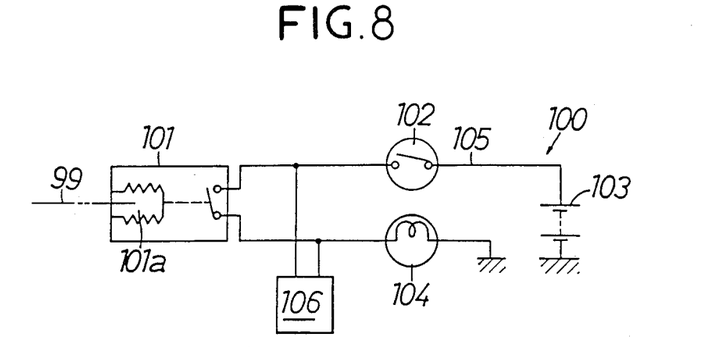

Referring to FIGS. 2 and 8, a detector 100 for detecting the normal operation of the modulator 17 is connected to the modulator. The detector 100 comprises a normally open pressure switch 101 having a pressure receiving chamber 101a brought into communication through an oil passage 99 between the outlet chamber 32 of the hydraulic pump 16 and the control hydraulic chamber 18 of the modulator 17, and a brake switch 102 to be closed when the front master cylinder 5f is being operated, the switches 101 and 102 being inserted in series in an energizing circuit 105 from a power source 103 to a display lamp 104. A delay device 106 is connected in parallel with the pressure switch 101 to the circuit 105.

In order to detect whether the modulator 17 is normal, the front master cylinder 5f is lightly operated to a degree that the front wheel 2f is not locked during the running. Then, the brake switch 102 is first closed, and the pump 16 is actuated as the master cylinder 5f operates and the hyrdaulic pressure between the outlet chamber 32 and the control hydraulic chamber 18 rises normally. Then, the hydraulic pressure is received by the pressure receiving chamber 101a and the pressure switch 101 is closed. The energizing circuit 105 closes and the display lamp 104 lights. In this way, the driver can detect that the hydraulic chamber 18 normally rises in pressure.

Next, if during the actual braking, the front wheel 2f is about to lock and the modulator 17 is normally operated as described above, the hydraulic pressure is decreased or restored between the outlet chamber 32 and the hydraulic chamber 18 by the repetition of the control of the exhaust pressure valve 20. Therefore, the pressure switch 101 intermittently flickers the display lamp 104 thereby enabling to detect the normal operation of the modulator 17. At that time, since the flicking period of the display lamp is adjusted by the delay device 106, the good visibility of flickering is obtained.

In this case, if the hydraulic pressure of the hydraulic chamber 18 remains lowered to a level below a preset value, the pressure switch 101 is turned off and the display lamp unlights.

It is noted that with this arrangement, the brake switch 102 may be eliminated.

Figure 9:
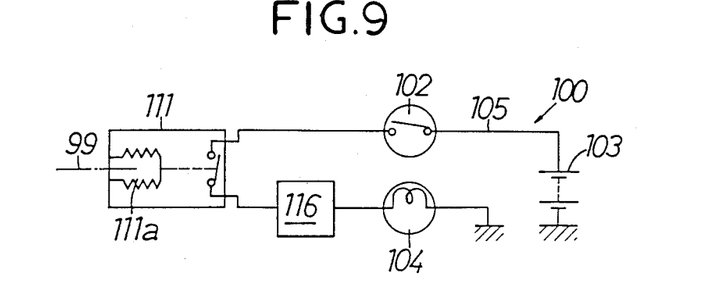
FIG. 9 shows a variation of the electric circuit diagram shown in FIG. 8.

FIG. 7 shows a modified embodiment of the detector 100. When the modulator 17 is abnormal, that is, when the pressure of the control hydraulic chamber 18 is not increased even by the operation of the front master cylinder 5f, the display lamp 104 is made to be lighted. That is, the detector 100 is constructed in such a manner that the pressure switch 111 for communicating the pressure receiving chamber 111a between the outlet chamber 32 and the hydraulic chamber 18 employs the normally closed type, and the switch 111, the brake switch 102 and the delay device 116 are inserted into series into the energizing circuit 105 from the power source 103 to the display lamp 104.

With this arrangement, when during the travelling of the vehicle, the front master cylinder 5f is lightly operated to a degree that the front wheel 2f is not locked, the switch 102 is closed but if the hydraulic pressure of the hydraulic chamber 18 normally rises by the operation of the pump 16, the pressure switch 111 is opened. Thus, the energizing circuit 105 maintains in its open state and the lamp 104 remains unlighted.

During the actual braking, if the front wheel 2f is about to lock and the modulator operates normally, the hydraulic pressure between the outlet chamber 32 and the control hydraulic chamber 18 is decreased or restored by the repetition of the control of the exhaust pressure valve 20. Also in this embodiment, the pressure switch 111 is intermittently turned on and off to flicker the lamp 104. This flickering period is adjusted by the delay device 116.

If the pressure of the control hydraulic chamber 18 is not increased, the switch 111 closes and the lamp 104 keeps lighting.

Accordingly, it is possible to detect whether the modulator is normally operated by the operation or inoperative state or intermittent operative state of the display such as the display lamp, to prevent the lowering of the braking force resulting from the inferior operation of the modulator.

Figure 10:
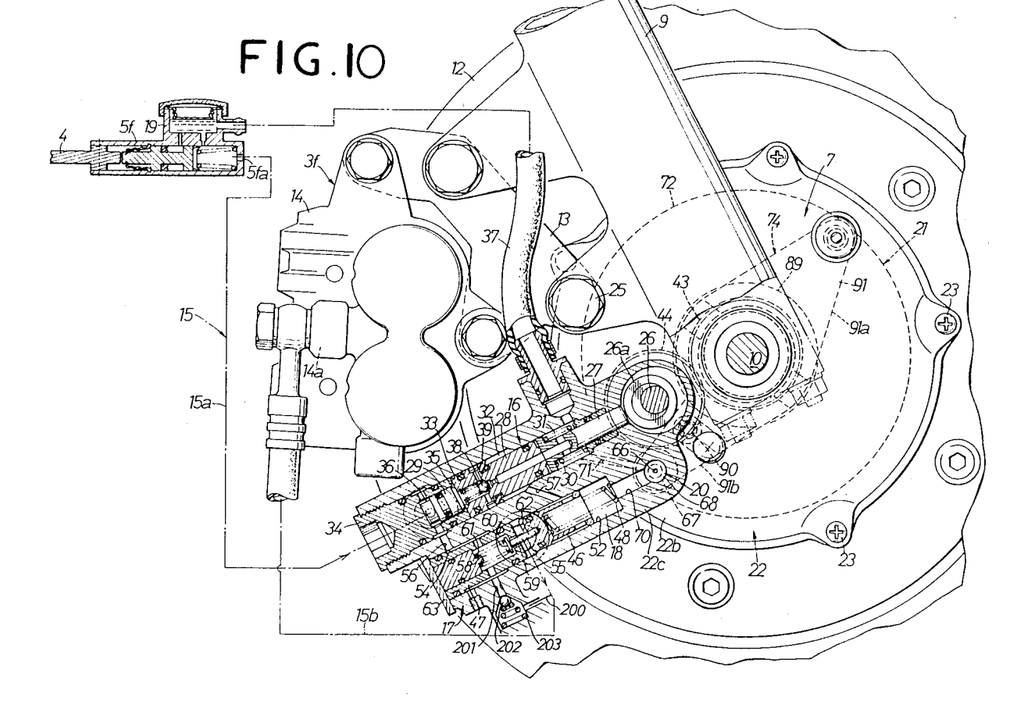
FIG. 10 is a side elevation similar to FIG. 2, showing one modified embodiment of the aforementioned embodiment including a construction which bypasses a modulator to a braking pressure transmission line.

FIG. 10 shows a modified embodiment of the previously described embodiment which has the bypassing function that when the output hydraulic pressure of the master cylinder exceeds the prest value, the output hydraulic pressure of the master cylinder is transmitted to the wheel brake irrespective of the operation of the modulator.

In FIG. 10, a bypass 200 is provided to provide a connection between the input hydraulic chamber 54 and output hydraulic chamber 55 of the modulator 17.

Functionally, the bypass 200 bypasses the modulator 17 to connect up- and downstream conduits 15a and 15b of the conduit 15 to each other. This bypass 200 has an orifice 201 and a check valve 202 incorporated in series in that order from the input hydraulic chamber 54. The check valve 202 is opened when the hydraulic pressure of the input hydraulic chamber 54, or the output hydraulic pressure of the front master cylinder 5f exceeds a preset high pressure value. The valve opening pressure is determined by a set load of a valve spring 203 for biasing the check valve 202 toward the closing position.

When the valve 20 is left opened for some trouble during the braking, the pressure reducing condition of the control hydraulic chamber 18 of the modulator 17 continues and the valve opening rod 62 is retracted by the pressure reducing piston 46 to close the valve body 60. At that time, if the output hydraulic pressure of the front master cylinder 5f is increased to a level above the preset high pressure value, the check valve 202 is opened to bring the up- and downstream conduits 15a and 15b of the conduit 15 into communication through the bypass 200. Thus, the output hydraulic pressure of the front master cylinder 5f may be transmitted to the front wheel brake 3f to apply the desired braking force thereto.

At that time, the transmission of the output hydraulic pressure of the front master cylinder 5f to the front wheel brake 3f is gradually controlled by the orifice 201 provided in the bypass 200. Therefore, it is possible to prevent the rapid operation of the brake 3f.

What is claimed is:

1. An angular deceleration sensor wherein a flywheel is rotatably and axially slidably supported on a drive shaft operatively connected to a detected subject which rotates in a fixed direction, and between the drive shaft and the flywheel are interposed in series a clutch which normally transmits a driving torque from the drive shaft to the flywheel and is adapted to slip to allow an over-running rotation of the flywheel when an angular deceleration in excess of a predetermined value occurs in the subject, and a cam mechanism for imparting an axial displacement to the flywheel in response to the over-running rotation of the flywheel, the axial displacement of the flywheel being output as an angular deceleration signal, said clutch comprising a unidirectional clutch which assumes a locked state when the drive shaft is in a drive side position relative to the flywheel, wherein said unidirectional clutch comprises engaging projections provided on one of a drive shaft side and a flywheel side, and resilient pawls provided on the other side and engageable with said engaging projections.

2. An angular deceleration sensor wherein a flywheel is rotatably and axially slidably supported on a drive shaft operatively connected to a detected subject which rotates in a fixed direction, and between the drive shaft and the flywheel are interposed in series a clutch which normally transmits a driving torque from the drive shaft to the flywheel and is adapted to slip to allow an over-running rotation of the flywheel when an angular deceleration in excess of a predetermined value occurs in the subject, and a cam mechanism for imparting an axial displacement to the flywheel in response to the over-running rotation of the flywheel, the axial displacement of the flywheel being output as an angular deceleration signal, said clutch comprising a unidirectional clutch which assumes a locked state when the drive shaft is in a drive side position relative to the flywheel, wherein said cam mechanism includes means for controlling the axial displacement of the flywheel to an amount less than a preset value, and wherein said cam mechanism comprises engaging teeth provided on the flywheel and engaging teeth associated with said drive shaft and put in engagement with said engaging teeth of said flywheel when said drive shaft is in said drive side position relative to said flywheel, and said means for controlling the axial displacement comprises projecting portions formed on said flywheel in an circumferentially spaced relation and projecting portions formed on said drive shaft side correspondingly to the first mentioned projecting portions, these projecting portions being formed to have a pitch set smaller than that of said engaging teeth.

3. The sensor of claim 2, wherein a transmission wheel is interposed between said drive shaft and said flywheel, said unidirectional clutch is provided between said drive shaft and said transmission wheel, and said cam mechanism is provided between said transmission wheel and said flywheel.

4. An angular deceleration sensor wherein a flywheel is rotatably and axially slidably supported on a drive shaft operatively connected to a detected subject which rotates in a fixed direction, and between the drive shaft and the flywheel are interposed in series a clutch which normally transmits a driving torque from the drive shaft to the flywheel and is adapted to slip to allow an over-running rotation of the flywheel when an angular deceleration in excess of a predetermined value occurs in the subject, and a cam mechanism for imparting an axial displacement to the flywheel in response to the over-running rotation of the flywheel, the axial displacement of the flywheel being output as an angular deceleration signal, said clutch comprising a unidirectional clutch which assumes a locked state when the drive shaft is in a drive side position relative to the flywheel, wherein a transmission wheel is interposed between said drive shaft and said flywheel, said unidirectional clutch is provided between said drive shaft and said transmission wheel, and said cam mechanism is provided between said transmission wheel and said flywheel, and wherein said cam mechanism comprises saw teeth formed on one side of the transmission wheel and saw teeth formed on a side of said flywheel opposed to said one side of said transmission wheel for engagement with said sawteeth of the transmission wheel, said cam mechanism further comprising projecting portions formed on said transmission wheel in a circumferentially equally spaced relation and projecting portions formed circumferentially on said flywheel in a manner corresponding to the projecting portions of the transmission wheel, and wherein at the time of relative rotation between the flywheel and the transmission wheel, said projecting portions of the flywheel and the transmission wheel come into contact with one another before the saw teeth of said flywheel ride over the saw teeth of said transmission wheel, to cause the flywheel and transmission wheel to rotate integrally.

5. An angular deceleration sensor wherein a flywheel is rotatably and axially slidably supported on a drive shaft operatively connected to a detected subject which rotates in a fixed direction, and between the drive shaft and the flywheel are interposed in series a clutch which normally transmits a driving torque from the drive shaft to the flywheel and is adapted to slip to allow an over-running rotation of the flywheel when an angular deceleration in excess of a predetermined value occurs in the subject, and a cam mechanism for imparting an axial displacement to the flywheel in response to the overrunning rotation of the flywheel, the axial displacement of the flywheel being output as an angular deceleration signal, said clutch comprising a unidirectional clutch which assumes a locked stated when the drive shaft is in a drive side position relative to the flywheel, wherein a transmission wheel is interposed between said drive shaft and said flywheel, said unidirectional clutch is provided between said drive shaft and said transmission wheel, and said cam mechanism is provided between said transmission wheel and said flywheel, and wherein said cam mechanism comprises saw teeth formed on one side of the transmission wheel and saw teeth formed on a side of said flywheel opposed to said one side of said transmission wheel for engagement with said saw teeth of the transmission wheel, said cam mechanism further comprising projecting portions formed on said transmission wheel in a circumferentially or said flywheel in a manner corresponding to the projecting portions of the transmission wheel, and wherein at the time of relative rotation between the flywheel and the transmission wheel, said projecting portions of the flywheel and the transmission wheel come into contact with one another before the saw teeth of said flywheel ride over the saw teeth of said transmission wheel, to cause the flywheel and transmission wheel to rotate integrally.

6. The sensor of claim 3, wherein said transmission wheel is made of a synthetic resin.

7. The sensor of claim 1, wherein said detected subject is a wheel for a vehicle provided with a brake system.

8. The sensor of claim 1, wherein said cam mechanism includes means for controlling the axial displacement of the flywheel to an amount less than a preset value.

9. The sensor of claim 4, wherein said cam mechanism comprises saw teeth formed on one side of the transmission wheel and saw teeth formed on a side of said flywheel opposed to said one side of said transmission wheel for engagement with said saw teeth of the transmission wheel, said cam mechanism further comprising projecting portions formed on said transmission wheel in a circumferentially equally spaced relation and projecting portions formed circumferentially on said flywheel in a manner corresponding to the projecting portions of the transmission wheel, and wherein at the time of relative rotation between the flywheel and the transmission wheel, said projecting portions of the flywheel and the transmission wheel come into contact with one another before the saw teeth of said flywheel ride over the saw teeth of said transmission wheel, to cause the flywheel and transmission wheel to rotate integrally.

10. The sensor of claim 4, wherein said transmission wheel is made of a synthetic resin.

* * * * *